US008829845B2

(12) United States Patent
Bradfield

(10) Patent No.: US 8,829,845 B2
(45) Date of Patent: Sep. 9, 2014

(54) STARTER MACHINE SYSTEM AND METHOD

(75) Inventor: Michael D. Bradfield, Anderson, IN (US)

(73) Assignee: Remy Technologies, LLC, Pendleton, IN (US)

( * ) Notice: Subject to any disclaimer, the term of this patent is extended or adjusted under 35 U.S.C. 154(b) by 202 days.

(21) Appl. No.: 13/407,651

(22) Filed: Feb. 28, 2012

(65) Prior Publication Data

US 2013/0221682 A1 Aug. 29, 2013

(51) Int. Cl.
*H02P 3/18* (2006.01)

(52) U.S. Cl.
USPC ............. 318/727; 318/51; 318/567; 318/600; 318/778; 123/179.3

(58) Field of Classification Search
USPC ............ 318/51, 567, 600, 727, 778; 701/102, 701/103, 113; 123/179.3, 179.4
See application file for complete search history.

(56) References Cited

U.S. PATENT DOCUMENTS 4,597,025 A * 6/1986 Rutchik et al. .................. 361/94
5,622,148 A * 4/1997 Xue et al. ................. 123/179.25
6,011,377 A 1/2000 Heglund et al.
6,087,800 A * 7/2000 Becker et al. ................. 318/778
6,104,157 A 8/2000 Kramer et al.
6,323,562 B1 11/2001 Renner et al.
6,608,394 B2 8/2003 Osada et al.
6,634,332 B2 10/2003 Saito et al.
6,651,603 B2 11/2003 Osada et al.
6,653,807 B2 11/2003 Saito et al.
6,702,718 B2 3/2004 Tani
6,754,579 B2 6/2004 Kamiya et al.
6,817,329 B2 11/2004 Buglione et al.
6,822,544 B2 11/2004 Shiga et al.
7,009,475 B2 3/2006 Niimi et al.
7,027,911 B2 4/2006 Nishikawa et al.
7,066,128 B2 6/2006 Satake et al.
7,177,755 B2 2/2007 Nishikawa et al.
7,218,010 B2 5/2007 Albertson et al.
7,219,007 B2 5/2007 Schuster et al.
7,269,499 B2 9/2007 Murakami
7,275,509 B2 10/2007 Kassner
7,281,510 B2 10/2007 Kondo
7,287,500 B2 10/2007 Izumi et al.

(Continued)

FOREIGN PATENT DOCUMENTS

JP 2002070699 3/2002

OTHER PUBLICATIONS

WIPO Search Report and Written Opinion dated Oct. 29, 2012 for corresponding Application No. PCT/US2012/032801; 7 sheets.

*Primary Examiner* — Paul Ip
(74) *Attorney, Agent, or Firm* — Greenberg Traurig, LLP

(57) ABSTRACT

Embodiments of the invention provide a starter machine including an electronic control unit. The electronic control unit can be in communication with one or more sensors. The control system can include a starter machine that is in communication with the electronic control unit. The starter machine can comprise a solenoid assembly that includes a plurality of biasing members, a motor that is coupled to a pinion, and power module and controller that is coupled to the motor. In some embodiments, at least one of the power module and the controller are configured to control a speed of the pinion to substantially synchronize the pinion speed and the speed of an engine component.

13 Claims, 4 Drawing Sheets

(56) References Cited

U.S. PATENT DOCUMENTS

| | | | | |
|---|---|---|---|---|
| 7,458,353 | B2 | 12/2008 | Takahashi | |
| 7,535,328 | B2 | 5/2009 | Kurasawa | |
| 7,628,138 | B2 * | 12/2009 | Ando | 123/406.13 |
| 7,701,104 | B2 | 4/2010 | Akemakou | |
| 7,733,201 | B2 | 6/2010 | Yoneshima | |
| 7,760,056 | B2 | 7/2010 | Utsunomiya et al. | |
| 7,797,099 | B2 * | 9/2010 | Terada | 701/112 |
| 7,821,220 | B2 * | 10/2010 | El-Ibiary | 318/600 |
| 7,848,875 | B2 | 12/2010 | Nakai | |
| 7,861,683 | B2 | 1/2011 | Saitoh | |
| 7,934,436 | B2 | 5/2011 | Laubender | |
| 7,949,461 | B2 | 5/2011 | Takahashi | |
| 7,982,565 | B2 | 7/2011 | Bradfield et al. | |
| 8,036,815 | B2 * | 10/2011 | Okumoto et al. | 701/110 |
| 8,069,832 | B2 * | 12/2011 | Okumoto et al. | 123/179.4 |
| 8,196,558 | B2 * | 6/2012 | Okumoto et al. | 123/179.4 |
| 8,408,175 | B2 * | 4/2013 | Schoenek et al. | 123/179.1 |
| 8,419,592 | B2 * | 4/2013 | Fujiwara | 477/167 |
| 8,494,758 | B2 * | 7/2013 | Ishikawa et al. | 701/112 |
| 8,510,019 | B2 * | 8/2013 | Okumoto et al. | 701/103 |
| 2003/0150417 | A1 | 8/2003 | Miwa | |
| 2003/0209373 | A1 | 11/2003 | Egami et al. | |
| 2004/0168664 | A1 | 9/2004 | Senda et al. | |
| 2004/0195016 | A1 * | 10/2004 | Shimizu et al. | 180/65.1 |
| 2006/0058897 | A1 | 3/2006 | Senda et al. | |
| 2006/0117876 | A1 | 6/2006 | Lepres et al. | |
| 2006/0201266 | A1 | 9/2006 | Kajino et al. | |
| 2007/0199533 | A1 | 8/2007 | Takahashi | |
| 2008/0197797 | A1 * | 8/2008 | El-Ibiary | 318/567 |
| 2009/0020091 | A1 | 1/2009 | Botzenhard et al. | |
| 2009/0183595 | A1 | 7/2009 | Niimi | |
| 2009/0224557 | A1 * | 9/2009 | Reynolds et al. | 290/38 R |
| 2009/0295399 | A1 | 12/2009 | Ueda et al. | |
| 2010/0000487 | A1 | 1/2010 | Hoshino et al. | |
| 2010/0033066 | A1 | 2/2010 | Murata et al. | |
| 2010/0036591 | A1 | 2/2010 | Nakai | |
| 2010/0050970 | A1 * | 3/2010 | Okumoto et al. | 123/179.4 |
| 2010/0059007 | A1 | 3/2010 | Senda et al. | |
| 2010/0083926 | A1 * | 4/2010 | Okumoto et al. | 123/179.4 |
| 2010/0090526 | A1 | 4/2010 | Itou | |
| 2010/0180849 | A1 * | 7/2010 | Senda et al. | 123/179.4 |
| 2010/0184562 | A1 | 7/2010 | Senda et al. | |
| 2010/0217484 | A1 | 8/2010 | Mizuno | |
| 2010/0217493 | A1 | 8/2010 | Tomura et al. | |
| 2010/0222973 | A1 | 9/2010 | Senda et al. | |
| 2010/0229815 | A1 | 9/2010 | Senda et al. | |
| 2010/0242905 | A1 * | 9/2010 | Machida et al. | 123/339.14 |
| 2010/0251851 | A1 | 10/2010 | Usami | |
| 2010/0251852 | A1 | 10/2010 | Murata et al. | |
| 2010/0251853 | A1 | 10/2010 | Usami et al. | |
| 2010/0256896 | A1 * | 10/2010 | Kitano et al. | 701/113 |
| 2010/0257975 | A1 | 10/2010 | Niimi et al. | |
| 2010/0264670 | A1 | 10/2010 | Usami et al. | |
| 2010/0264764 | A1 | 10/2010 | Usami et al. | |
| 2010/0264765 | A1 | 10/2010 | Haruno et al. | |
| 2010/0269630 | A1 | 10/2010 | Niimi et al. | |
| 2010/0269631 | A1 | 10/2010 | Niimi et al. | |
| 2010/0269776 | A1 | 10/2010 | Mizuno | |
| 2010/0282199 | A1 | 11/2010 | Heyers et al. | |
| 2010/0282200 | A1 | 11/2010 | Notani | |
| 2010/0326389 | A1 * | 12/2010 | Okumoto et al. | 123/179.4 |
| 2011/0001589 | A1 | 1/2011 | Usami et al. | |
| 2011/0005486 | A1 | 1/2011 | Nakamura | |
| 2011/0056450 | A1 * | 3/2011 | Notani | 123/179.4 |
| 2011/0084786 | A1 | 4/2011 | Niimi et al. | |
| 2011/0095852 | A1 | 4/2011 | Niimi et al. | |
| 2011/0112740 | A1 | 5/2011 | Hashimoto | |
| 2011/0115238 | A1 | 5/2011 | Biessenberger et al. | |
| 2011/0118962 | A1 | 5/2011 | Couetous et al. | |
| 2011/0132308 | A1 | 6/2011 | Liu et al. | |
| 2011/0137544 | A1 * | 6/2011 | Kawazu et al. | 701/113 |
| 2011/0139108 | A1 * | 6/2011 | Hashim | 123/179.3 |
| 2011/0146609 | A1 | 6/2011 | Enoki | |
| 2011/0172901 | A1 * | 7/2011 | Okumoto et al. | 701/113 |
| 2011/0174255 | A1 * | 7/2011 | Neuburger et al. | 123/179.4 |
| 2011/0178695 | A1 * | 7/2011 | Okumoto et al. | 701/103 |
| 2011/0184626 | A1 * | 7/2011 | Mauritz et al. | 701/102 |
| 2011/0202254 | A1 * | 8/2011 | Ishikawa et al. | 701/103 |
| 2011/0248803 | A1 | 10/2011 | Niimi et al. | |
| 2012/0031231 | A1 * | 2/2012 | Schoenek et al. | 74/7 C |
| 2012/0035837 | A1 * | 2/2012 | Okumoto et al. | 701/113 |
| 2012/0275078 | A1 * | 11/2012 | Kokubun et al. | 361/160 |
| 2012/0312269 | A1 * | 12/2012 | Fujiwara et al. | 123/179.4 |
| 2013/0111865 | A1 * | 5/2013 | Hansen et al. | 56/11.3 |
| 2013/0293160 | A1 * | 11/2013 | El-Ibiary | 318/51 |

* cited by examiner

STARTER MACHINE SYSTEM AND METHOD

BACKGROUND

Some electric machines can play important roles in vehicle operation. For example, some vehicles can include a starter machine, which can, upon a user closing an ignition switch, lead to cranking of engine components of the vehicle. Some starter motors can include a field assembly that can produce a magnetic field to rotate some starter machine components.

SUMMARY

Some embodiments of the invention provide a starter machine that can be in communication with an electronic control unit. In some embodiments, the electronic control unit can be in communication with one or more sensors. In some embodiments, the starter machine can include a solenoid assembly that can include a plurality of biasing members and a motor operatively coupled to a pinion. In some embodiments, the starter machine can include a power module and controller that can be electrically coupled to the motor. In some embodiments, at least one of the power module and the controller can be configured and arranged to control a speed of the motor to substantially synchronize the speeds of the pinion and a component of an engine.

DETAILED DESCRIPTION

Figure 1:
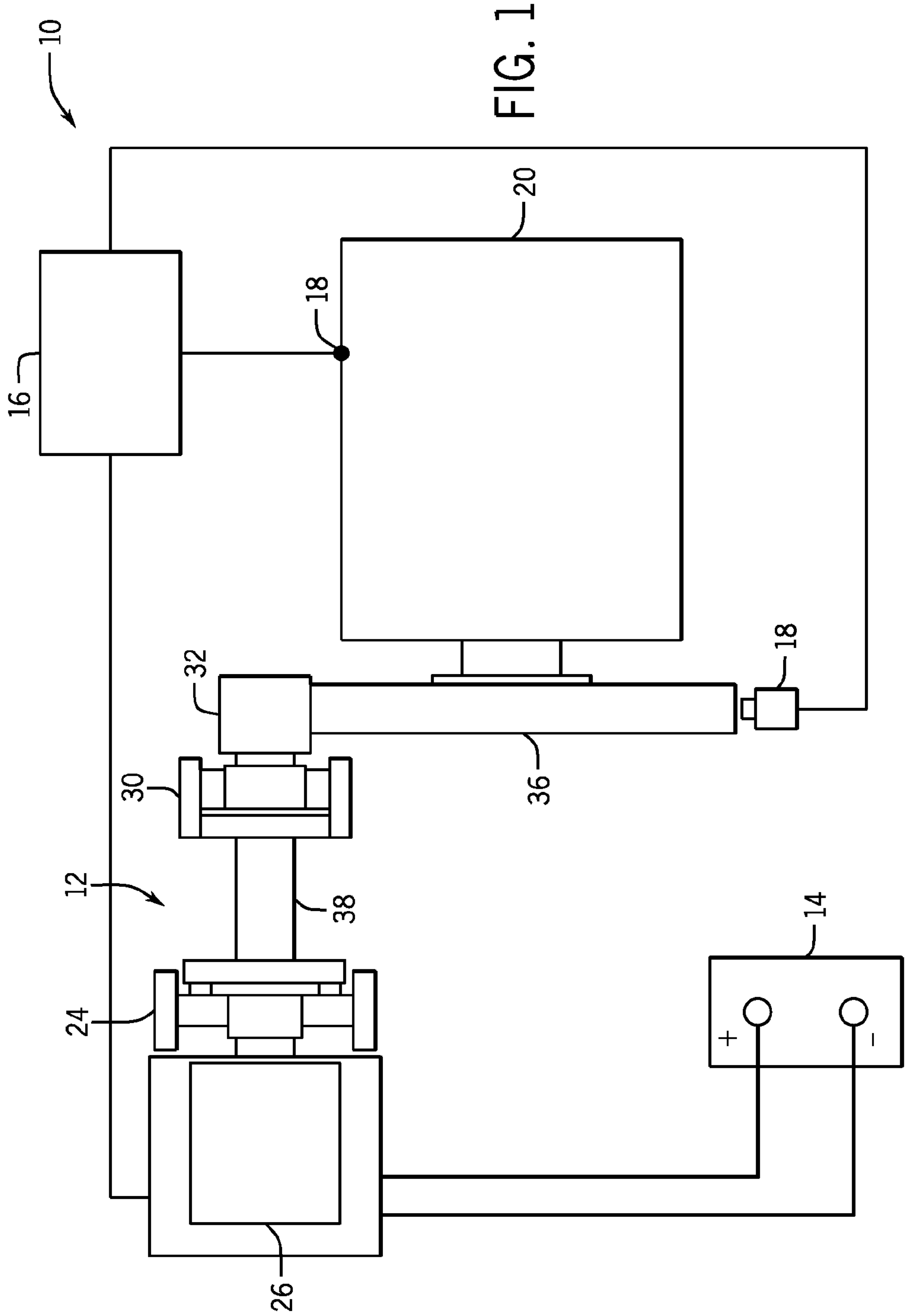
FIG. 1 is a diagram of a machine control system according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives that fall within the scope of embodiments of the invention.

FIG. 1 illustrates a starter machine control system 10 according to one embodiment of the invention. The system 10 can include an electric machine 12, a power source 14, such as a battery, an electronic control unit 16, one or more sensors 18, and an engine 20, such as an internal combustion engine. In some embodiments, a vehicle, such as an automobile, can comprise the system 10, although other vehicles can include the system 10. In some embodiments, non-mobile apparatuses, such as stationary engines, can comprise the system 10.

The electric machine 12 can be, without limitation, an electric motor, such as a hybrid electric motor, an electric generator, a starter machine, or a vehicle alternator. In one embodiment, the electric machine can be a High Voltage Hairpin (HVH) electric motor or an interior permanent magnet electric motor for hybrid vehicle applications.

Figure 2:
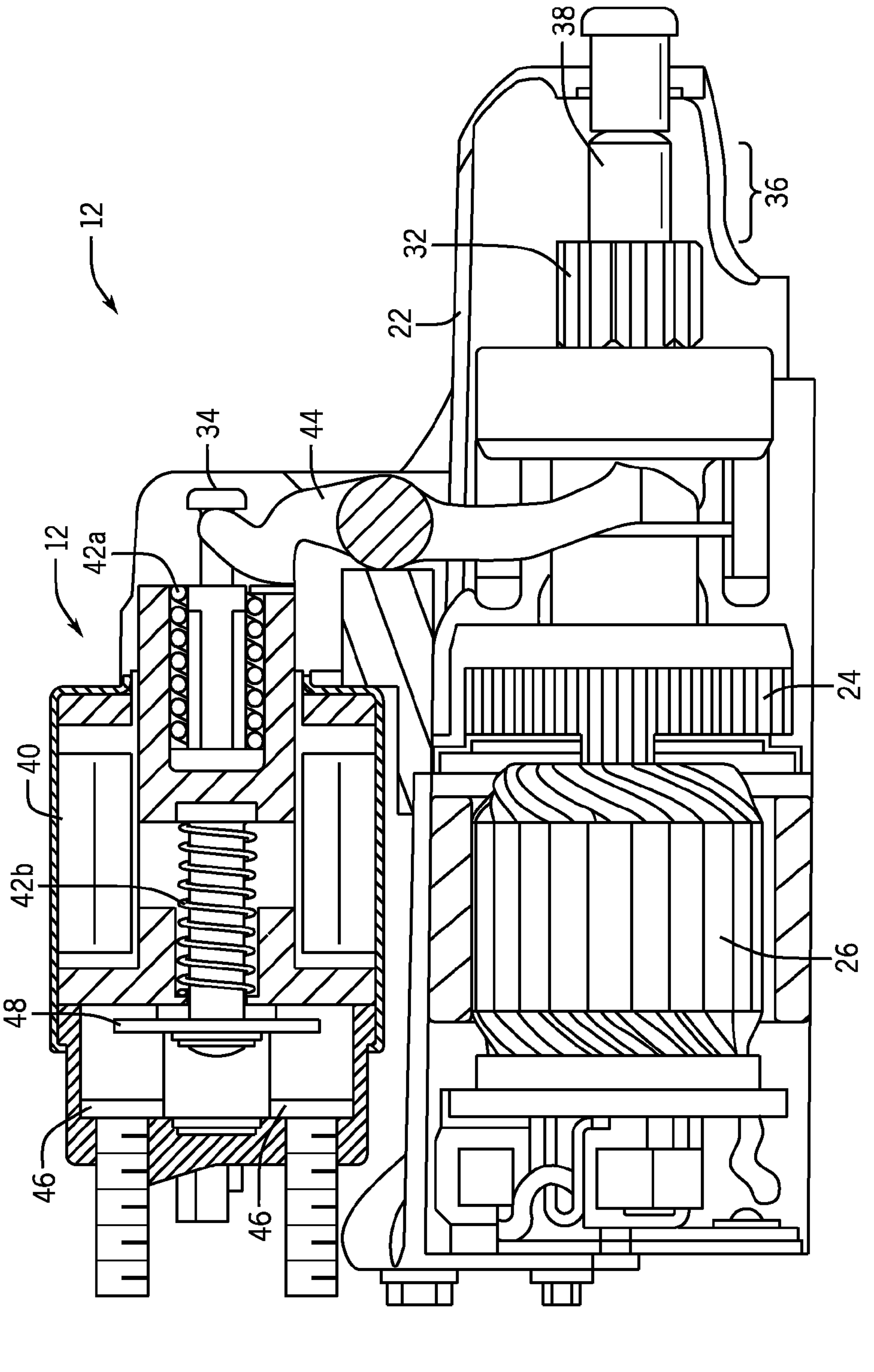
FIG. 2 is cross-sectional view of a starter machine according to one embodiment of the invention.

As shown in FIG. 2, in some embodiments, the electric machine 12 can comprise a starter machine 12. In some embodiments, the starter machine 12 can comprise a housing 22, a gear train 24, a brushed or brushless motor 26, a solenoid assembly 28, a clutch 30 (e.g., an overrunning clutch), and a pinion 32. In some embodiments, the starter machine 12 can operate in a generally conventional manner. For example, in response to a signal (e.g., a user closing a switch, such as an ignition switch), the solenoid assembly 28 can cause a plunger 34 to move the pinion 32 into an engagement position with a ring gear 36 of a crankshaft of the engine 20. Further, the signal can lead to the motor 26 generating an electromotive force, which can be translated through the gear train 24 to the pinion 32 engaged with the ring gear 36. As a result, in some embodiments, the pinion 32 can move the ring gear 36, which can crank the engine 20, leading to engine 20 ignition. Further, in some embodiments, the clutch 30 can aid in reducing a risk of damage to the starter machine 12 and the motor 26 by disengaging the pinion 32 from a shaft 38 connecting the pinion 32 and the motor 26 (e.g., allowing the pinion 32 to spin freely if it is still engaged with the ring gear 36).

In some embodiments, the starter machine 12 can comprise multiple configurations. For example, in some embodiments, the solenoid assembly 28 can comprise one or more configurations. In some embodiments, the solenoid assembly can comprise the plunger 34, a coil winding 40, and a plurality of biasing members 42 (e.g., springs or other structures capable of biasing portions of the solenoid assembly 28). In some embodiments, a first end of a shift lever 44 can be coupled to the plunger 34 and a second end of the shift lever 44 can be coupled to the pinion 32 and/or a shaft 38 that can operatively couple together the motor 26 and the pinion 32. As a result, in some embodiments, at least a portion of the movement created by the solenoid assembly 28 can be transferred to the pinion 32 via the shift lever 44 to engage the pinion 32 with the ring gear 36, as previously mentioned.

Figure 3:
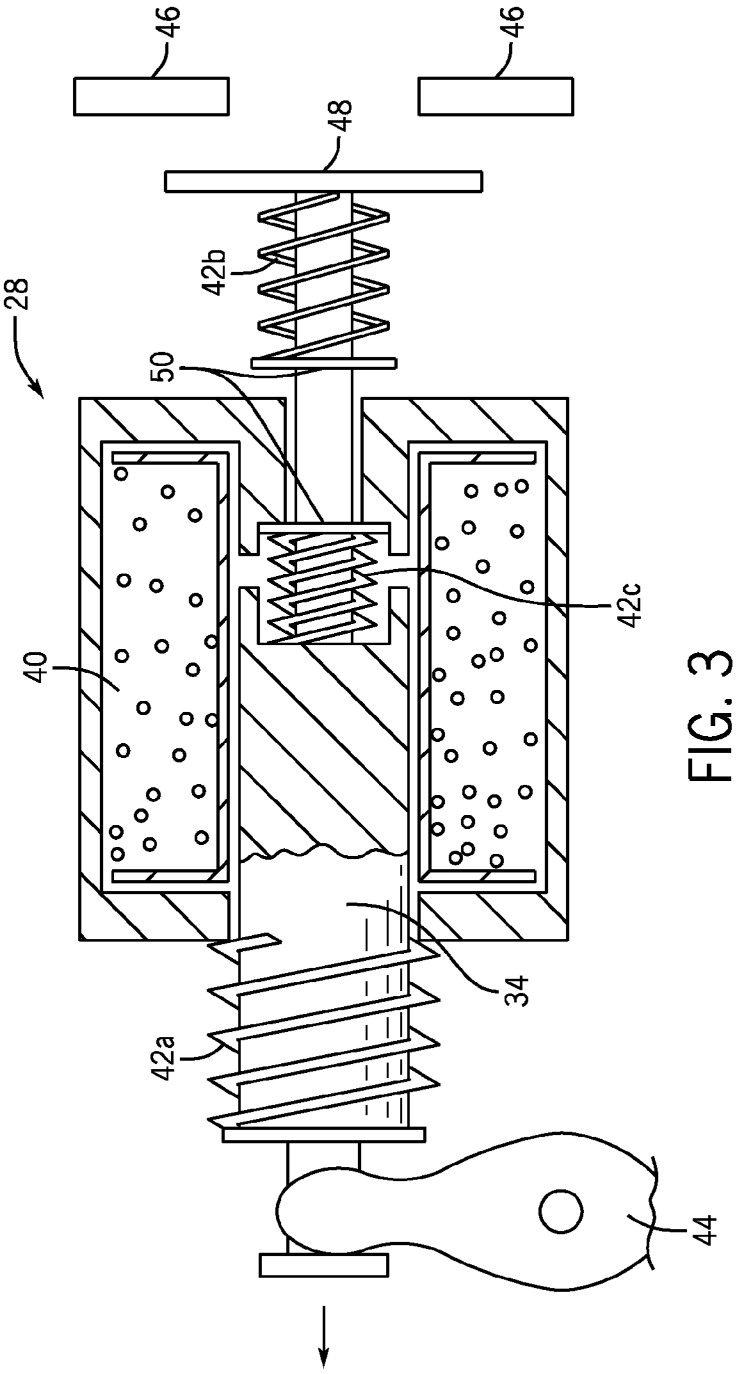
FIG. 3 is cross-sectional view of a solenoid assembly according to one embodiment of the invention.

Moreover, as shown in FIG. 3, the solenoid assembly 28 can comprise at least a plunger-return biasing member **42*a* and a contact over-travel biasing member 42*b*. When the starter machine 12 is activated (e.g., by the user closing the ignition switch), the system 10 can energize the coil winding 40, which can cause movement of the plunger 34 (e.g., in a generally axial direction). For example, current flowing through the coil winding 40 can draw-in or otherwise move the plunger 34, and this movement can be translated to engagement of the pinion 32 via the shift lever 44 (i.e., the magnetic field created by current flowing through coil winding 40 can cause the plunger 34 to move). Moreover, the plunger 34 moving inward as a result of the energized coil winding 40 can at least partially compress the plunger-return biasing member 42***a*.

Figure 4:
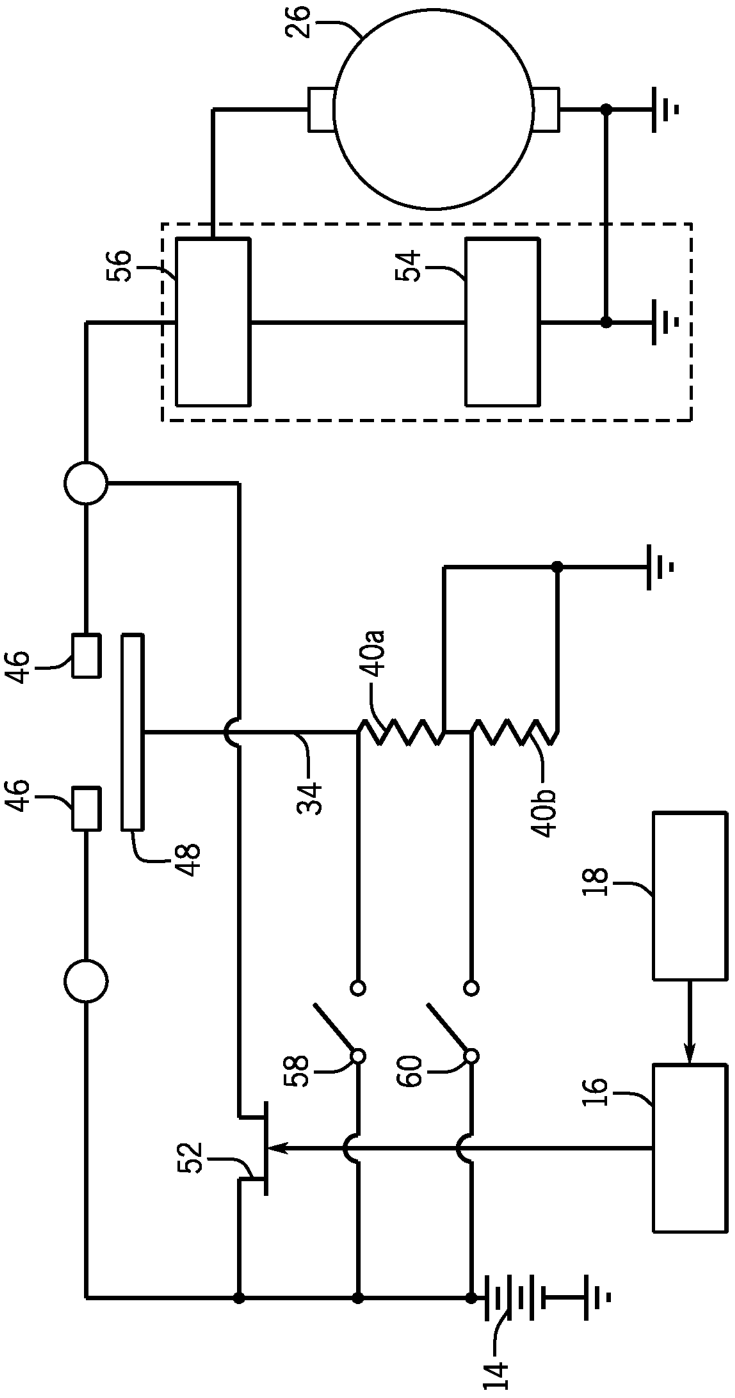
FIG. 4 is a circuit diagram of a starter machine control system according to one embodiment of the invention.

Additionally, in some embodiments, the plunger 34 can be drawn-in or otherwise moved to a position (e.g., an axially inward position) so that at least a portion of the plunger 34 (e.g., a lateral end of the plunger 34) can at least partially engage or otherwise contact one or more contacts 46 to close a circuit that provides current to the motor 26 from the power source 14, as shown in FIG. 4. As a result, the motor 26 can be activated by the current flowing through the circuit closed by the plunger 34. For example, in some embodiments, the plunger 34 can comprise a plunger contact 48 that can engage the contacts 46 to close the circuit to enable current to flow to the motor 26. In some embodiments, the contact over-travel biasing member 42*b* can be coupled to and/or disposed over at least a portion of the plunger 34 at a position substantially adjacent to the plunger contact 48, as shown in FIG. 3. In some embodiments, the contact over-travel biasing member 42*b* can function to assist the plunger-return biasing member 42*a* in returning the plunger 34 to the home position. Additionally, in some embodiments, the contact over-travel biasing member 42*b* can also function to assist in separating the plunger contact 48 and the contacts 46 (e.g., the biasing force of the compressed contact over-travel biasing member 42*b* can aid in moving the plunger contact 48 away from the contacts 46).

In some embodiments, after partial or total completion of the starting event (e.g., the engine has at least partially turned over and combustion has begun), the coil winding 40 can be at least partially de-energized. In some embodiments, the reduction or removal of force retaining the plunger 34 in place (e.g., the magnetic field created by current flowing through the coil winding 40) can enable the compressed plunger-return biasing member 42*a* to expand. As a result, the plunger-return biasing member 42*a* can expand and return the plunger 34 to its original position before the initial energization of the coil winding 40 (i.e., a "home" position). Accordingly, the pinion 32 can be withdrawn from the ring gear 36 and return to its original position within the housing 22.

In some embodiments, the starter machine 12 can comprise at least one more biasing member 42. For example, as shown in FIG. 3, in some embodiments, the starter machine 12 can include at least one auxiliary biasing member 42*c*. In some embodiments, the auxillary biasing member 42*c* can at least partially enable segregation and/or separation of some operations of the starter machine 12 into two or more steps. In some embodiments, the auxiliary biasing member 42*c* can create a stopping point along the axial path of the plunger 34. For example, as shown in FIG. 3, in some embodiments, the auxiliary biasing member 42*c* can be disposed immediately adjacent to one or more washers 50 or other structures that can function as artificial stops when the plunger 34 moves during activation of the solenoid assembly 28. By way of example only, the auxiliary biasing member 42*c* and washers 50 can be coupled to a portion of the solenoid assembly 28 and configured and arranged so that as the plunger 34 moves during solenoid assembly 28 activation, the resistive force of the auxiliary biasing member 42*c* engaging one or more of the washers 50 can require additional force to be overcome to engage the plunger contact 48 and the contacts 46 (e.g., creating an artificial stopping point prior to the plunger contact 48 engaging the contacts 46).

As shown in FIG. 4, in some embodiments, the solenoid assembly 28 can comprise more than one coil winding 40. For example, as shown in FIG. 4, the solenoid assembly 28 can comprise two coil windings 40. In other embodiments, the solenoid assembly 28 can comprise more than two coil windings 40 (not shown). In some embodiments, a first coil winding 40*a* can be configured and arranged to move the plunger 34 from the home position (i.e., a position occupied by the plunger 34 when little to no current flows through any of the coil windings 40) to the artificial stopping point. For example, current flowing through the first coil winding 40*a* can create a magnetic field sufficient to move the plunger 34 from the home position to the artificial stop, but the magnetic field can be of a magnitude that is insufficient to overcome the resistive force of the auxiliary biasing member 42*c*. As a result, activation of the first coil winding 40*a* can move the plunger 34 to the artificial stop, but in some embodiments, the plunger contact 48 will not engage the contacts 46 to close the circuit.

In some embodiments, the coil winding 40 can comprise a second coil winding 40*b*. The second coil winding 40*b* can be configured and arranged to move the plunger 34 from the artificial stop to a position where the plunger contacts 48 can engage the contacts 46 to close the circuit and provide current from the power source 14 to the motor 26. For example, current flowing through the second coil winding 40*b* can create a magnetic field sufficient to move the plunger 34 from the artificial stop to a position where the plunger contact 48 can engage the contacts 46. In some embodiments, the first coil winding 40*a* can be deactivated before and/or after activation of the second coil winding 40*b*. Additionally, in some embodiments, the second or the first coil winding 40*a*, 40*b* can comprise a magnetic field of sufficient magnitude to overcome the resistive force of the auxiliary biasing member 42*c* so that only one coil winding 40 needs to be used. Moreover, in some embodiments, the solenoid assembly 28 can function without the auxiliary biasing member 42*c* so that either the first coil winding 42*a* or the second coil winding 42*b* would be needed to engage the plunger contact 48 and the contacts 46 to close the circuit.

In some embodiments, the coil windings 40*a*, 40*b* can comprise other configurations. In some embodiments, the coil windings 40*a*, 40*b* can function as conventional coil windings 40*a*, 40*b*. Regardless of the number and/or configuration of biasing members 42, the first coil winding 40*a* can be configured and arranged to function as a "pull-in" coil winding 42 and the second coil winding 40*b* can be configured and arranged to function as a "hold-in" coil winding 42, or vice versa. For example, the first coil winding 42*a* can be initially activated by the electronic control unit 16 to initially move the plunger 34 from the home position. In some embodiments, the solenoid assembly 28 can operate without the auxiliary biasing member 42*c*, and as a result, the first coil winding 40*a* can move the plunger 36 until the contacts 46, 48 engage to close the circuit (i.e., the first coil windings 40*a* can function to initially "pull-in" the plunger 34) and to move the pinion 32 into engagement with the ring gear 36. In some embodiments, the second coil winding 40*b* can be activated upon the contacts 46, 48 engaging or another signal resulting from the plunger 34 moving. Upon activation, the second coil winding 40*b* can function to retain or "hold-in" the plunger 36 during a starting episode. Moreover, during activation of the second coil winding 40*b*, the solenoid assembly 28 can be configured and arranged so that the first coil winding 40*a* is substantially or completely deactivated by the activation of the second coil winding 40*b*. For example, the second coil winding 40*b* can comprise a greater resistance and, as a result, a lesser current relative to the first set of coil windings 40*a*.

Accordingly, the second coil winding 40*b* can operate at a lower temperature relative to the first coil windings 40*a*, and, as a result, can operate for longer periods of time because of the lesser thermal output by the winding 40*b*. In some embodiments, after the engine 20 has been started, the second coil winding 40*b* an be substantially or completely deactivated and the plunger-return biasing member 42*a* can move the plunger 34 back to the home position.

In some embodiments, the plunger 34, auxiliary biasing member 42*c*, the washers 50, the coil windings 40*a*, 40*b*, and/or other portions of the solenoid assembly 28 can be configured and arranged so that when the plunger 34 reaches the artificial stop, the pinion 34 can be positioned substantially adjacent to the ring gear 36. For example, current can flow through the first coil winding 40*a* so that the plunger 34 is moved (e.g., in a generally inward direction toward the contacts 46) and the pinion 32 moves (e.g., axially moves) more adjacent to the ring gear 36, via the shift lever 44. As previously mentioned, the auxiliary biasing member 42*c* can at least partially slow down or stop movement of the plunger 34 before the plunger contact 48 engages the contacts 36 (i.e., the plunger 34 can stop at the artificial stopping point). As a result, by circulating current only through the first coil winding 40*a*, the plunger 34 will move to the artificial stop, but will nearly or completely stop at the artificial stop. Because the plunger 34 is coupled to the pinion 32 and the shaft 38 via the shift lever 44, this movement of the plunger 34 from the home position to the artificial stop can move the pinion 32 to a point substantially adjacent to the ring gear 36, but not yet contacting the ring gear 36. As previously mentioned, the system 10 can receive a signal to move forward with the starting episode and current can flow through the second coil winding 40*b* to overcome the biasing forces of the auxiliary biasing member 42*c*. Energizing the second coil winding 40*b* (e.g., in addition to or in lieu of the first coil winding 40*a*) can overcome the biasing forces of the auxiliary biasing member 42*c* so that the plunger 34 can engage the contacts 46, the pinion 32 can engage the ring gear 36, and current can flow to the motor 26 to enable the starter machine 12 to start the engine 20.

In some embodiments, the coil windings 40*a*, 40*b* can be coupled to and/or in communication with the electronic control unit 16 and the power source 14. For example, as previously mentioned, current can circulate through the coil windings 40*a*, 40*b* to move the plunger 34, and, as a result, move the pinion 32 toward the ring gear 36. In some embodiments, the current circulating through the coil windings 40*a*, 40*b* can originate from the power source 14 (e.g., the battery). Moreover, in some embodiments, the electronic control unit 16 can control the current flow to one, some, or all of the coil windings 40*a*, 40*b* from the power source 14 so that the plunger 34 moves upon the electronic control unit 16 transmitting the necessary signals for current to flow to the coil windings 40*a*, 40*b*.

In some embodiments, one or more of the sensors 18 can comprise an engine speed sensor 18. For example, the engine speed sensor 18 can detect and transmit data to the electronic control unit 16 that correlates to the speed of the engine 20, the crankshaft, and/or the ring gear 36. In some embodiments, the engine speed sensor 18 can communicate with the electronic control unit 16 via wired and/or wireless communication protocols.

In some embodiments, the starter machine 12 can comprise one or more solid-state switches 52, a controller 54, and a power module 56, as shown in FIG. 4. In some embodiments, the solid-state switch 52 can comprise a field-effect transistor, such as a MOSFET. In other embodiments, the solid-state switch 52 can comprise any other type of solid-state switch 52. As shown in FIG. 4, in some embodiments, the solid-state switch 52 can be in communication (e.g., wired and/or wireless communication) with the electronic control unit 16 and can be electrically coupled to the power source 14. For example, in some embodiments, the solid-state switch 52 can be controlled by the electronic control unit 16 so that upon receiving signals from the control unit 16, the switch 52 can enable a current flow to the motor 26, as shown in FIG. 4. In some embodiments, power can be provided to the motor 26 at a lesser current and/or voltage through the solid-state switch 52 relative to the power provided from the power source 14 to the motor 26 when the plunger 34 closes the circuit. Moreover, as shown in FIG. 4, the solid-state switch 52 can be electrically coupled to the power module 56 so that some or all of the current passing through the solid-state switch 52 can pass through the power module 56 before passing through the motor 26.

As shown in FIG. 4, in some embodiments, the controller 54 can be coupled to the power module 56 and the motor 26. For example, the motor 26 can be electrically connected to ground and the controller 54 can be coupled to a line and/or wire electrically connecting the motor 26 to ground. Moreover, in some embodiments, the line or wire electrically connecting the motor 26 to ground can comprise a resistor (not shown) or other device configured and arranged to provide resistance and the controller 54 can be coupled to the resistor or coupled to the wire or line at a point substantially adjacent to the resistor. Furthermore, as discussed in greater detail below, the power module 56 can be configured and arranged to at least partially control current flowing to the motor 26 based on data input from the controller 54 and the solid-state switch 52.

In addition to the conventional engine 20 starting episode (i.e., a "cold start" starting episode) previously mentioned, the starter machine control system 10 can be used in other starting episodes. In some embodiments, the control system 10 can be configured and arranged to enable a "stop-start" starting episode. For example, the control system 10 can start an engine 20 when the engine 20 has already been started (e.g., during a "cold start" starting episode) and the vehicle continues to be in an active state (e.g., operational), but the engine 20 is temporarily inactivated (e.g., the engine 20 has substantially or completely ceased moving).

Moreover, in some embodiments, in addition to, or in lieu of being configured and arranged to enable a stop-start starting episode, the control system 10 can be configured and arranged to enable a "change of mind stop-start" starting episode. The control system 10 can start an engine 20 when the engine 20 has already been started by a cold start starting episode and the vehicle continues to be in an active state and the engine 20 has been deactivated, but continues to move (i.e., the engine 20 is decelerating). For example, after the engine receives a deactivation signal, but before the engine 20 substantially or completely ceases moving, the user can decide to reactivate the engine 20 so that the pinion 32 engages the ring gear 36 as the ring gear 36 is decelerating, but continues to move (e.g., rotate). After engaging the ring gear 36, the motor 26 can restart the engine 20 via the pinion 32 engaged with the ring gear 36. In some embodiments, the control system 10 can be configured for other starting episodes, such as a conventional "soft start" starting episodes (e.g., the motor 26 is at least partially activated during engagement of the pinion 32 and the ring gear 36).

The following discussion is intended as an illustrative example of some of the previously mentioned embodiments employed in a vehicle, such as an automobile, during a starting episode. However, as previously mentioned, the control system 10 can be employed in other structures for engine 20 starting.

As previously mentioned, in some embodiments, the control system 10 can be configured and arranged to start the engine 20 during a change of mind stop-start staring episode. For example, after a user cold starts the engine 20, the engine 20 can be deactivated upon receipt of a signal from the electronic control unit 16 (e.g., the vehicle is not moving and the engine 20 speed is at or below idle speed, the vehicle user instructs the engine 20 to inactivate by depressing a brake pedal for a certain duration, etc.), the engine 20 can be deactivated, but the vehicle can remain active (e.g., at least a portion of the vehicle systems can be operated by the power source 14 or in other manners). At some point after the engine 20 is deactivated, but before the engine 20 ceases moving, the vehicle user can choose to restart the engine 20 by signaling the electronic control unit 16 (e.g., via releasing the brake pedal, depressing the acceleration pedal, etc.). After receiving the signal, the electronic control unit 16 can use at least some portions of the starter machine control system 10 to restart the engine 20. For example, in order to reduce the potential risk of damage to the pinion 32 and/or the ring gear 36, a speed of the pinion 32 can be substantially synchronized with a speed of the ring gear 36 (i.e., a speed of the engine 20) when the starter machine 12 attempts to restart the engine 20.

In some embodiments, after receiving the restart signal, the starter machine control system 10 can begin a process to restart the engine 20. The electronic control unit 16 can enable current to flow from the power source 14 to the first coil winding 40*a*. For example, as shown in FIG. 4, in some embodiments, the starter machine 12 can comprise a first relay 58 and a second relay 60. In some embodiments, the first relay 58 can at least partially regulate current flow through the first coil winding 40*a* and the second relay 60 can at least partially regulator current flow through the second coil winding 40*b*. For example, upon receiving a signal from the electronic control unit 16 to restart the engine 20, the first relay 58 can close, which can enable current to flow through the first coil winding 40*a*. As a result, the plunger 34 can move from the home position to the artificial stopping point because of the auxiliary biasing member 42*c* functioning to stop movement of the plunger 34 at the artificial stopping point. As a result, the pinion 32 can be moved to a point substantially adjacent to the ring gear 36 (e.g., an "abutment" position).

In some embodiments, once the pinion 32 is substantially adjacent to the ring gear 36, the motor 26 can become at least partially energized to substantially synchronize speeds of the pinion 32 speed and the ring gear 36. For example, damage to the pinion 32 and/or the ring gear 36 can be at least partially avoided and/or reduced by having the pinion 32 and the ring gear 36 moving at similar speeds upon engagement.

In some embodiments, synchronization of the speeds of the pinion 32 and the ring gear 36 can be at least partially provided by the engine speed sensor 18, the electronic control unit 16, and the solid-state switch 52. For example, the engine speed sensor 18 can detect speeds of some of the engine 20 components (e.g., crankshaft, ring gear 36, etc.) and transmit that speed data to the electronic control unit 16. The solid-state switch 52 can couple the motor 26 to the power source 14 and can be configured and arranged to regulate voltage passing to the motor 26 from the power source 14. As previously mentioned, the electronic control unit 16 can be in communication (e.g., wired and/or wireless communication) with the solid-state switch 52 so that the electronic control unit 16 can at least partially control operations of the switch 52 (e.g., via pulse width modulation). As a result, the electronic control unit 16 can control the voltage passing from the power source 14 to the motor 26 via the solid-state switch 52. For example, the electronic control unit 16 can be configured and arranged to process and correlate the engine speed data transmitted by the engine speed senor 18 to a voltage necessary to move the motor 26 at a substantially similar relative speed. Accordingly, after receiving and processing the engine speed data from the engine speed sensor 18, the electronic control unit 16 can transmit instructions the solid-state switch 52, via pulse width modulation, to allow a voltage to reach the motor 28 that substantially correlates with the engine speed (e.g., the voltage passing through the solid-state switch 52 can cause the motor 28 to move at a relative speed substantially similar to the engine speed).

In some embodiments, the controller 54 and the power module 56 can also regulate the voltage of the motor 26. As shown in FIG. 4, in some embodiments, at least a portion of the power that reaches the motor 26 initially flows through the power module 56 and/or the controller 54. For example, in some embodiments, the voltage flowing from the solid-state switch 52 is not directly applied to the motor 26, but rather initially flows through the controller 54 and the power module 56.

As previously mentioned, in some embodiments, the controller 54 and the power module 56 can be configured and arranged to adjust the voltage applied to the motor 26 based on the speed of the motor 26. In some embodiments, the controller 54 can be configured and arranged to sense a back electromotive force of the motor 26. The back electromotive force sensed by the controller 54 can substantially linearly correlate with the actual speed of the motor 26 (e.g., the back electromotive force is a linear function of motor 26 speed), and, accordingly, can be used by the controller 54 to assess the speed of the motor 26.

In some embodiments, back electromotive force can be sensed by using a relationship between the voltage and current applied to the motor 26 and the resistance of the motor 26. For example, although the resistance of the motor 26 can remain substantially constant or fixed, a back electromotive force (i.e., a back voltage or a voltage opposing the voltage applied to the motor 26 via the power module 56) can develop during operations of the motor 26. Moreover, as previously mentioned, a resistor can be disposed between the motor 26 and the ground connection (i.e., the resistor can be in a series relationship with the motor 26) and the controller 54 can be coupled to the resistor or the line substantially adjacent to the resistor. As a result, the controller 54 can sense a voltage drop across the resistor to determine the current flowing through the motor 26. By comparing the current through the motor 26 with the voltage applied to the motor 26 (i.e., the voltage from the power module 56 to the motor 26), the controller 54 can determine the back electromotive force. As previously mentioned, the back electromotive force can be a linear function of the motor 26. As a result of being configured and arranged to calculate the back electromotive force, the controller 54 can be able to process the back electromotive force data to assess the speed of the motor 26 to substantially or completely synchronize the speeds of the pinion 32 and the ring gear 36.

In some embodiments, the controller 54 and the power module 56 can be configured and arranged to synchronize the speeds of the pinion 32 and the ring gear 36. As previously mentioned, the voltage sent from the solid-state switch 52 can pass through the controller 54 and/or the power module 56 prior to passing through the motor 26 and can generally correspond to the engine 20 speed. As a result, the controller 54, via the voltage from the solid-state switch 52, can assess the speed of the engine 20, including the ring gear 36. In some embodiments, the controller 54 can be configured and arranged to compare the speeds of the ring gear 36 and the speed of the motor 26 to assess whether substantial or complete synchronization has occurred. Moreover, in some embodiments, the controller 54 can be configured so that it can periodically or continually sense the voltage from the solid-state switch 52 to ensure that the relative speeds of the pinion 32 and the ring gear 36 remain substantially or completely synchronized.

In some embodiments, the controller 54 can transmit signals to the power module 56 to provide substantial or complete synchronization of the speeds of the pinion 32 and the ring gear 36. For example, in some embodiments, the power module 56 can comprise one or more solid-state switches (e.g., MOSFETs) (not shown) to regulate the voltage entering the motor 26. As a result, after receiving signals from the controller 54 (e.g., via pulse width modulation) regarding the voltage necessary to substantially or completely synchronize the speeds of the pinion 32 and the ring gear 36, the power module 56 can enable voltage flow to the motor 26 of a voltage quantity sufficient to synchronize the speeds of the pinion 32 and the ring gear 36. Accordingly, the controller 54 and the power module 56 can operate as an open-loop control system to synchronize the speeds of the pinion 32 and the ring gear 36.

In some embodiments, when the speeds of the pinion 32 and the ring gear 36 are substantially or completely synchronized, the pinion 32 can engage the ring gear 36. As previously mentioned, initially, after closing of the first relay 58, the first coil winding 40*a* can be energized, which moves the plunger 34 to the artificial stopping point and the pinion 32 can be moved substantially adjacent to the ring gear 36 as a result of movement of the plunger 34 and the shift lever 44. In some embodiments, the electronic control unit 16 can be configured so that after a predetermined amount of time, the second relay 60 can close, the second coil winding 40*b* can be energized, which moves the plunger 34 to a position where the plunger contact 48 can engage the contacts 46 to provide full power to the motor 26. Moreover, as the plunger 34 moves to engage the contacts 46, the pinion 32 can be moved to engage the ring gear 36.

In some embodiments, the electronic control unit 16 can be configured to energize the second coil winding 40*b* after a predetermined time interval necessary to allow synchronization of the speeds of ring gear 36 and the pinion 32. For example, the duration of the predetermined time interval can be at least partially based on results of testing of the starter machine control system 10 to assess the time interval necessary to substantially or completely synchronize the speeds of the pinion 32 and the ring gear 36. In some embodiments, the predetermined time interval can comprise a greater amount of time than the time necessary to substantially or completely synchronize the speeds of ring gear 36 and the pinion 32. For example, the time interval can be a greater amount of time because the controller 54 and the power module 56, as previously mentioned, are configured to continually synchronize the speeds of the ring gear 36 and the pinion 32. Accordingly, after initially synchronizing the relative speeds of the pinion 32 and the ring gear 36, the power module 56 and the controller 54 can continue to substantially or completely synchronize the relative speeds of the pinion 32 and the ring gear 36. Further, the controller 54 and power module 56 can continue to synchronize the speeds of the ring gear 36 and the pinion 32 even when the engine 20 substantially or completely ceases moving (e.g., no voltage being transmitted from the solid-state switch 52 yields no voltage to the motor 26). Accordingly, the electronic control unit 16 can close the second relay 60 and activate the second coil winding 40*b* at any point after the minimum amount of time necessary to substantially or completely synchronize the speeds of ring gear 36 and the pinion 32.

In some embodiments, the starter machine 12 can comprise alternative configurations. In some embodiments, the solenoid assembly 28 can function with a conventional number of biasing members 42. For example, in some embodiments, the electronic control unit 16 can communicate with the solid-state switch 52 to begin synchronizing the speeds of ring gear 36 and the pinion 32 without energization of the first coil windings 40*a*. As a result, the pinion 32 can begin moving when the plunger 34 is in the home position. After the predetermined time interval, the electronic control unit 16 can close at least one of the first and second relays 58, 60 to energize at least one of the first and second coil windings 40*a*, 40*b*, which can lead to the plunger contact 48 engaging the contacts 46. As a result, the motor 26 can receive full power and the pinion 32 can engage the ring gear 36 to restart the engine 20.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A starter machine comprising:

a starter machine capable of being in communication with an electronic control unit in communication with one or more sensors, the starter machine further comprising:

at least one solid-state switch;

a solenoid assembly including a plurality of biasing members, the plurality of biasing members comprising at least two of a plunger return biasing member, a contact-overrun biasing member, and an auxiliary biasing member;

a motor being operatively coupled to a pinion and being at least partially disposed within a housing;

a power module and controller being electrically coupled to the motor and being at least partially disposed within the housing; and wherein the controller is configured and arranged to move a plunger to an artificial stopping point comprising the auxiliary biasing member engaging an artificial stop; and wherein at least one of the power module and the controller are configured and arranged to control a speed of the motor to substantially synchronize the speed of the pinion with a speed of a component of an engine when the plunger has reached the artificial stopping point, the component comprising at least a ring gear of the engine.

2. The starter machine of claim 1, wherein the at least one solid-state switch is in communication with the electronic control unit.

3. The starter machine of claim 2, wherein at least one of the sensors comprises an engine sensor, and wherein the electronic control unit is configured and arranged to control a voltage passing through the solid-state switch at least partially based on data received from the engine sensor.

4. The starter machine of claim 1, wherein the solid-state switch is electrically coupled to at least one of the power module and the controller.

5. The starter machine of claim 1, wherein the power module comprises a plurality of solid-state switches.

6. The starter machine of claim 1, wherein the controller is configured and arranged to assess a back electromotive force of the motor for use in substantially synchronizing the speed of the pinion and the speed of a component of the engine.

7. A starter machine comprising:

a starter machine being in communication with an electronic control unit that is in communication with at least one engine senor, the engine sensor being configured and arranged to sense a speed of an engine, the starter machine further comprising a solenoid assembly comprising a plurality of biasing members and a plunger, the plurality of biasing members comprising a plunger return biasing member, a contact-overrun biasing member, and an auxiliary biasing member;

a solid-state switch being in communication with the electronic control unit, a motor being operatively coupled to a pinion, a power module being electrically coupled to the motor and the solid-state switch, and a controller being in communication with at least the power module and the motor; and wherein the controller is configured and arranged to move a plunger to an artificial stopping point comprising the auxiliary biasing member engaging an artificial stop; and wherein the controller is configured and arranged to substantially synchronize a speed of the pinion with the speed of the engine at least partially based on a back electromotive force of the motor; and wherein the controller is configured and arranged to substantially synchronize the speed of the pinion with a speed of a ring gear of the engine when the plunger has reached the artificial stopping point; and wherein the controller is configured and arranged to move the plunger to a position which causes the pinion to engage the ring gear.

8. The starter machine of claim 7, wherein the solenoid assembly comprises a first coil winding electrically coupled to a first relay and a second coil winding electrically coupled to a second relay.

9. The starter machine of claim 8, wherein the electronic control unit is configured and arranged to activate the second coil winding after a predetermined time interval after activating the first coil winding.

10. The starter machine of claim 7, wherein the power module comprises one or more solid-state switches.

11. The starter machine of claim 7, wherein the electronic control unit is configured and arranged regulate the solid-state switch by pulse width modulation.

12. The starter machine of claim 7, wherein the electronic control unit is configured and arranged to control a voltage passing through the solid-state switch at least partially based on data received from the engine sensor.

13. The starter machine of claim 7, wherein the engine sensor is configured to sense a speed of the ring gear.

* * * * *